July 23, 1968 A. S. FARBER 3,394,356

RANDOM ACCESS MEMORIES EMPLOYING THRESHOLD TYPE DEVICES

Filed April 19, 1965

INVENTOR.
ARNOLD S. FARBER

BY S. P. Tedesco

ATTORNEY

United States Patent Office 3,394,356
Patented July 23, 1968

3,394,356

RANDOM ACCESS MEMORIES EMPLOYING THRESHOLD TYPE DEVICES

Arnold S. Farber, Yorktown Heights, N.Y., assignor to International Business Machines Corporation, Armonk, N.Y., a corporation of New York Filed Apr. 19, 1965, Ser. No. 449,092
21 Claims. (Cl. 340—173)

ABSTRACT OF THE DISCLOSURE

A nondestructive random-access memory is described wherein each memory cell includes a transistor device adapted as a nonlinear gate and operative as a current driving source for a threshold storage device, e.g., tunnel diode, bistable transistor circuit, etc. The emitter and collector of the gate transistor are connected to word and bit lines, respectively, and the base of the gate transistor is connected to the input of the threshold storage device. The emitter-collector circuit of the gate transistor is biased for normal operation when the word drive line is energized singularly or for saturated operation when word and bit lines are energized concurrently. Conduction in the gate transistor is controlled by the storage state of the threshold storage device. Energization of the word line supports carrier injection into the base region of the gate transistor only when the threshold storage device is in a low voltage "0" state and inhibited when the threshold storage device is in the high voltage "1" state. When the gate transistor is operated in the saturated mode (write "1" operation), emitter current is drawn largely from the base circuit and is sufficient to switch the threshold storage device from the low voltage "0" state to the high voltage "1" state. When the gate transistor is operated in the normal mode (write "0" and read "0" operations), emitter current is drawn largely from the collector circuit, i.e., bit line, and transient base current is insufficient to disturb the state of the threshold storage device. Read "0" and read "1" operations, therefore, are distinguished by the presence and absence, respectively, of collector current in the gate transistor and along the bit line. Write "0" and write "1" operations are distinguished by variations in the magnitude of base current, such base current being sufficient to switch the threshold storage device only when the gate transistor is saturated (write "1" operation). The use of the gating transistor reduces loading on the word and bit lines and avoids "threshold logic" limitations inherent in half-select, or coincident, techniques employed in prior art memory arrays.

This invention relates to random access memory arrays and, more particularly, to such memory arrays employing storage devices of the threshold type.

Many requirements of present day computers are best satisfied by nondestructive random-access memories. A nondestructive random-access memory is defined as one wherein interrogation is effected on a word basis without destruction of stored information. Such memories inherently exhibit shorter cycle times than do memories of the destructive readout type as interrogation of the latter necessarily includes a regenerative operation. Since cycle time is a limitation on the operational speed of a computer system, memories of shorter cycle times must be developed as speed requirements of such systems are increased.

In present day memory systems, the distribution of drive signals to effect the necessary memory operations, i.e., clear, write, and read, becomes more complex as the operational speed and capacity requirements of the memory are increased. Such problem is further aggravated when electronic threshold devices, e.g., tunnel diodes, bistable transistor circuits, etc., perform the storage function. For example, a write operation is effected generally by "threshold logic" techniques in that a change in state of the storage device is effected by the linear addition of half-select drive signals. Such "threshold logic" techniques impose rigid tolerance requirements on drive signal amplitudes and, also, the triggering threshold of the storage device. These tolerance requirements are rigid particularly in memory arrays of large capacity since variations in these parameters are cumulative within the system.

In large capacity memories, loading of signal drive lines by commoned memory cells introduces dispersion in the propagating characteristics of such drive lines. Such dispersion is due to the periodic capacitive and shunt resistive loading of the signal drive line by the memory cells. Dispersion effects become significant when the length of the drive line, generally a transmission line, is long. When the drive pulse has a fast rise time, dispersion effects are characterized by a fast rise to some fraction of full amplitude followed by a slower buildup to full amplitude of the propagated drive pulse, such fraction varying inversely as the length of the signal drive line. Accordingly, operational speeds of memories employing "threshold logic" techniques can only be increased at the expense of memory capacity. Moreover, where "threshold logic" techniques are employed, these dispersion effects cannot be compensated by overdriving techniques. Avoidance of "threshold logic" techniques would loosen tolerances on the triggering threshold of the storage devices and, also, drive pulse amplitudes whereby overdriving techniques can be employed to achieve fast operational speeds in large capacity memory arrays.

Accordingly, an object of this invention is to provide an improved random-access memory.

Another object of this invention is to provide a memory array wherein tolerances on the triggering threshold of the storage devices and, also, drive pulse amplitudes are loosened.

Another object of this invention is to provide a novel memory array employing threshold storage devices wherein coincidence selection is effected in avoidance of "threshold logic" techniques.

These and other objects and features of this invention are achieved by utilizing a transistor device as a nonlinear gate, the emitter-collector circuit being connected between word and bit drive lines and operative as a current driving source for a threshold storage device, e.g., tunnel diode, arranged in the base circuit. To effect read and write operations, the gate transistor is biased either for normal transistor operation when the word drive line is energized or for saturated operation when word and bit drive lines are concurrently energized; however, conduction in the gate transistor at this time is controlled by the storage state of the tunnel diode which is determinative of the base bias voltage. More particularly, energization of the word drive line supports carrier injection into the base region of the gate transistor only when the tunnel diode is in the low voltage "0" state (write "0" and read "0" operations); also, the bit drive line normally biases the collector of the gate transistor for normal transistor action (write "0" and read "1" operations) but, when energized, biases such region for near saturated operation (write "1" operation). Accordingly, the gate transistor is driven into saturation only when word and bit drive lines are energized concurrently and the tunnel diode is in the low voltage "0" state. When the gate transistor is saturated, the major portion of the emitter current is drawn largely from the base circuit and is sufficient to switch the tunnel diode to the high voltage "1" state. When the bit drive line is unenergized, the gate transistor is biased for normal transistor action whereby emitter current is drawn largely from the collector circuit, i.e., bit drive line, and transient base current is insufficient to disturb the state of the tunnel diode.

Read "0" and read "1" operations are distinguished by the presence and absence, respectively, of normal transistor action in the gate transistor when the word drive line is energized. For example, when the tunnel diode is in the low voltage "0" state, the gate transistor is biased for normal transistor action and emitter current is drawn largely along the bit drive line to indicate a stored "0." When the tunnel diode is in the high voltage "1" state, normal transistor action in the gate transistor is inhibited and disturbance of the bit drive line is minimal to indicate a stored "1."

The nonlinear operation of the gate transistor is reflected in variations in the magnitude of base current to effect the write "1" and write "0" operations and, also, in the magnitude of collector current to distinguish the read "1" and read "0" operations. Such nonlinear operation avoids "threshold logic" inherent in half-select, or coincident, techniques employed in prior art memory arrays whereby tolerance requirements on drive pulse amplitudes and triggering thresholds are very substantially eased. For example, word drive pulse amplitude is limited so as to be singularly ineffective to drive the gate transistor into saturation. Also, as word and bit drive lines are normally isolated from each other by back-biased emitter and base junctions, sneak paths in the memory array are avoided. Due to the high input collector impedance of the gate transistor, loading of the bit drive line is substantially reduced to minimize dispersion effects. Loading of the write drive line due to the somewhat lower input emitter impedance of the gate transistor can be compensated by overdriving techniques. Accordingly, operational speed as well as the capacity of the memory array are correspondingly increased. Delay in applying drive pulses to the memory cells will be determined largely by the propogation velocity of the drive lines, generally transmission lines, and not by dispersion effects introduced therealong due to the spatial loading of such lines by the memory cells.

An additional benefit is botained in that the available sense, or information, signal is not limited by the characteristics of the storage device. For example, in the prior art tunnel diode memory arrays, the amplitude of the available sense signal is limited by the peak current $I_p$ of the tunnel diode. In accordance with this invention, the tunnel diode serves only to bias the base region of the gate transistor while the gate transistor is effective to pass the word drive pulse during the read "0" operation to provide sense signal levels more compatible with computer logic circuits.

The foregoing and other objects, features, and advantages of this invention will be apparent from the following more particular description of preferred embodiments of the invention, as illustrated in the accompanying drawings:

Figure 1:
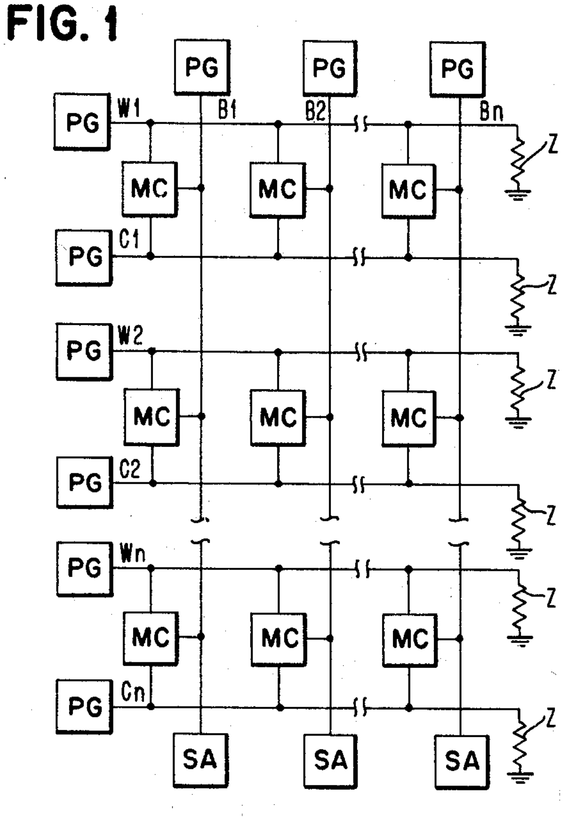
FIG. 1 is a block diagram illustrating a coordinate memory array in accordance with this invention.

Referring to FIG. 1, the memory matrix of this invention comprises a number of word drive lines W1, W2, . . . W$n$ and a number of associated clear drive lines C1, C2, . . . C$n$, respectively, arranged in paired parallel fashion. In addition, a number of bit drive lines B1, B2, . . . B$n$ are arranged in coordinate fashion with respect to the parallel arrangement of word drive lines W1, W2, . . . W$n$ and clear drive lines C1, C2, . . . C$n$ to define a memory cell location at each crossover. A memory cell MC is connected at each crossover to the corresponding word and bit drive lines W and B and, also, to the corresponding clear drive line C as in the case of the memory cells of FIGS. 2 and 6. The operation of the memory cell of FIG. 6, as hereinafter described, does not require clear drive line C and would be connected only between corresponding word and bit drive lines W and B.

Each word drive line W, bit drive line B, and clear drive line C is formed preferably as a transmission line, and connected at one end to a pulse generator PG. Each word drive line W and clear drive line C is terminated at the other end into its loaded characteristic impedance Z; each bit drive line B is connected at the other end to a sense amplifier SA. Pulse generators PG may be of conventional type and are operative to direct properly timed pulses of sufficient amplitude and proper polarity to effect necessary clearing, writing, and read memory operation, as hereinafter described.

Figure 2:
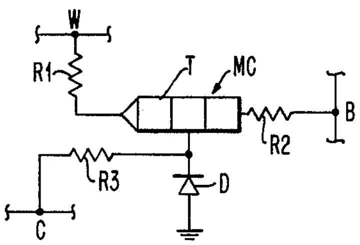
FIG. 2 illustrates a tunnel diode memory cell useful in the memory array of FIG. 1.

Referring to FIG. 2, a memory cell in accordance with this invention comprises an NPN silicon transistor T having emitter, base, and collector regions and particularly adapted as a nonlinear gate. The emitter-collector circuit of gate transistor T is connected to word drive line W along resistor R1 and to bit drive line B along resistor R2. A tunnel diode D adapted for bistable operation is connected at the cathode to the base region of gate transistor T and along resistor R3 to clear drive line C and at the anode to ground. During quiescent operation, word drive line W and bit drive line B normally reverse bias emitter and collector junctions, respectively, of gate transistor T regardless of the operating state of the tunnel diode D. As the input collector impedance of gate transistor T is relatively high, loading of bit drive line B by memory cell MC is minimal and word capacity is increased over prior art tunnel diode memory arrays. Also, the input emitter impedance of gate transistor T, although less than the input collector impedance, is sufficiently high to minimize loading on word drive line W whereby the bit capacity of the memory array is relatively large. Accordingly, a two-dimensional extension of the capacity of the memory array of FIG. 1 over prior art tunnel diode memory arrays is obtained. In prior art memory arrays, tunnel diode memory cells are generally resistively-coupled to word and bit drive lines, the resulting loading of such memory cells being significantly greater than that presented by the emitter and collector junctions, respectively, of transistor T when reversed biased.

As hereinafter described, the gate transistor T is particularly responsive to the selective energization of word and bit drive lines W and B by pulse generators PG to effect the necessary memory operations, i.e., clear, write, and read; with respect to the embodiments of FIGS. 2 and 5, transistor T does not effect the clear operation which is achieved by energization of clear drive line C. Nonlinear operation of gate transistor T is achieved by biasing such transistor for normal transistor operation when word drive line W is singularly energized and for saturated operation when word and bit drive lines W and B are concurrently energized; however, carrier injection into the base region of gate transistor T at this time is determined by the operating, or memory, state of tunnel diode D. Circuit parameters are determined such that energization of word drive line W supports carrier injection into the base region of gate transistor T only when tunnel diode D is in the low voltage "0" state. Accordingly, during a write operation, nonlinear operation of gate transistor T is reflected as variations in the magnitude of current drawn in the base circuit of such transistor which includes tunnel diode D. Current through tunnel diode D exceeds the peak current $I_p$ so as to switch from the low voltage "0" to the high voltage "1" state only when gate transistor T is operated in a saturated mode (write "1"). During a read operation, nonlinear operation of gate transistor T is reflected as variations in the magnitude of current drawn in the collector circuit including bit (sense) drive line B. When tunnel diode D is in the low voltage "0" state, energization of word drive line W supports normal operation of gate transistor T and substantial current is drawn along the bit drive line B (read "0"); during a read "1" operation, energization of word drive line W is not sufficient to support carrier injection into the base region of gate transistor T.

Figure 3:
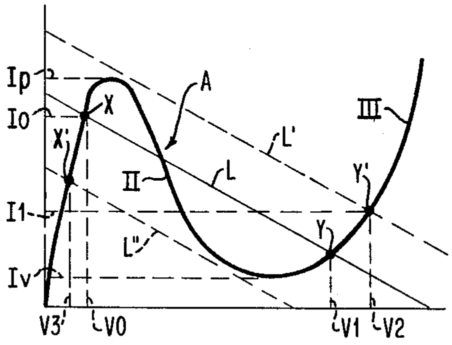
FIG. 3 illustrates the current-voltage characteristics of a tunnel diode device when adapted for bistable operation.
Figure 4:
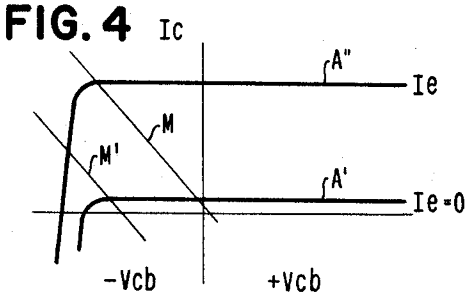
FIG. 4 illustrates the collector current $I_c$ to collector-base voltage $V_{cb}$ characteristics of a transistor device useful in understanding the operation of the memory cell of FIG. 2.

The operation of the memory cell of FIG. 2 is best described with respect to FIGS. 3 and 4. Curve A of FIG. 3 illustrates the well known current-voltage characteristics of a tunnel diode device. When biased in a forward direction, current through the tunnel diode device rises to a maximum peak current $I_p$ along a low voltage positive resistance region I, reduces along a negative resistance region II to a minimum valley current $I_v$, and subsequently rises along a high voltage positive resistance region III. Tunnel diode D is biased for bistable operation along positive resistance region I at point X and along positive resistance region III at point Y as indicated by quiescent load line L substantially defined by resistor R3 and the quiescent voltage maintained on clear drive line C by the connected pulse generator PG. When operated at point X, (low voltage "0" state), voltage V0 is developed across tunnel diode D; when operated at point Y (high voltage "1" state) voltage V1 is developed across tunnel diode D. Voltages developed across tunnel diode D are applied as biasing voltages to the base region of gate transistor T. Tunnel diode D is switched to stable operating points defined at X and Y by displacing the load line L downwardly as indicated by L' or upwardly as indicated by L'' to define a single operating point on curve A. For example, momentarily increasing current through tunnel diode D in excess of peak current $I_p$ establishes load line L' and causes tunnel diode D to switch to unstable operating point Y' along the high voltage region III of curve A. Conversely, momentarily decreasing current through tunnel diode D below the valley current $I_v$ establishes load line L'' and causes tunnel diode D to switch to unstable operating point X' along the low voltage region I of curve A. When quiescent conditions are established, the operation of tunnel diode D travels along the high and low voltage regions III and I, respectively, of curve A to points Y and X, respectively. As hereinafter described, variations in base current in gate transistor T are reflected as changes in current flow through tunnel diode D during the write operation; also, voltages developed across tunnel diode D and applied as base bias voltages to gate transistor T are effective to support or inhibit injection of carriers into the base region when word drive line W is energized to distinguish read "0" and read "1" operations, respectively.

Information storage in the memory cell of FIG. 2 is initiated when pulse generator PG directs a positive pulse along clear drive line C effective to reduce current in tunnel diode D of each connected memory cell MC below the valley current $I_v$. Such condition is indicated by load line L'' of FIG. 3 and tunnel diode D is returned to the low voltage "0" state at point X. A write operation is effected by energizing word drive line W by a negative drive pulse directed from pulse generator PG, the storage of a "1" or "0" in the corresponding memory cell MC being determined by the concurrent energization or nonenergization, respectively, of bit drive line B. The amplitude of the negative drive pulse along the word drive line W is sufficient to support carrier injection into the base region of gate transistor T. As shown in FIG. 4, the operation of gate transistor T is illustrated by curve A' which defines the relationship of collector current $I_c$ to collector-base voltage $V_{cb}$ when emitter current $I_e=0$; for purposes of description, leakage currents through gate transistor T are not considered. When word drive line W is energized, the operation of gate transistor T is illustrated by curve A'' of FIG. 4 for a finite emitter current $I_e$. During quiescent operation, pulse generator PG biases word drive line W to maintain gate transistor T "normally off." Also, in the preferred embodiment, bit drive line B is maintained at substantially zero volts to define with resistor R2 the operating load line M for gate transistor T as shown in FIG. 4. When bit drive line B is unenergized, i.e., at substantially zero volts, gate transistor T is biased for normal transistor operation, energization of word drive line W being singularly effective to support normal transistor operation (unsaturated). Accordingly, emitter current is drawn largely from the collector circuit including bit drive line B; since the $\alpha$ of gate transistor T is close to unity, transient base current at this time is insufficient to switch the tunnel diode D from the low voltage "0" to the high voltage "1" state. Referring to FIG. 3, transient base current drawn into the base region of gate transistor T is less than the difference between the peak current $I_p$ and current $I_o$ in tunnel diode D in the low voltage "0" state. Accordingly, the write "0" operation has been described wherein normal transistor operation is supported in gate transistor T when word drive line W is singularly energized.

To effect a write "1" operation, word and bit drive lines W and B are energized concurrently, energization of bit drive line B being effective to bias the collector region of gate transistor T for near-saturated operation as indicated in FIG. 4 by the displacement of the operating load line from M to M'. Accordingly, gate transistor T is driven into saturation and the major portion of emitter current $I_e$ flows in the base circuit to increase current through tunel diode D in excess of peak current $I_p$ as indicated by load line L' of FIG. 3. When tunnel diode D switches to a high voltage positive region at point Y', voltage V2 applied to the base region of gate transistor T is sufficient to inhibit carrier injection into the base region of gate transistor T. Accordingly, when tunnel diode D switches to the high voltage state, gate transistor T becomes "cut off" albeit the word and bit drive lines W and B remain energized. When gate transistor T becomes "cut off," the operation of tunnel diode D is established at point Y of curve A of FIG. 3.

Accordingly, write "0" and write "1" operations are distinguished by the operational state of gate transistor T, i.e., unsaturated or saturated, respectively. When word and bit drive line W and B are concurrently energized, gate transistor T is driven into saturation and the magnitude of base current is sufficient to switch tunnel diode D to the high voltage "1" state. When word drive line W is singularly energized, circuit conditions support normal transistor operation and transient base current is sufficient only to shuttle the operation of tunnel diode D along the low voltage portion I of the characteristic curve A of FIG. 3.

The read operation of the memory cell of FIG. 2 is effected by singularly energizing word drive line W with a negative drive pulse, which may be of equal magnitude as that used during the above-described write operations. At this time, the operation of gate transistor T is defined by load line M of FIG. 4. As hereinabove described, voltage V0 across tunnel diode D in the low voltage "0" state supports carrier injection into the base region of gate transistor T whereby substantial collector current is drawn along bit sense line B. This current pulse is sensed by sense amplifier SA, appropriately strobed, and indicates a stored "1" in memory cell MC. Also, the negative drive pulse is not sufficiently greater than voltage V1 across tunnel diode D in the high voltage "1" state to support carrier injection into the base region of gate transistor T. During a read "1" operation, gate transistor T remains "cut off" and the absence of collector current along bit drive line B indicates a stored "0" in memory cell MC. The read "0" and read "1" operations, therefore, are distinguished by the normal conduction or "cut off" operation of gate transistor T.

Figure 5:
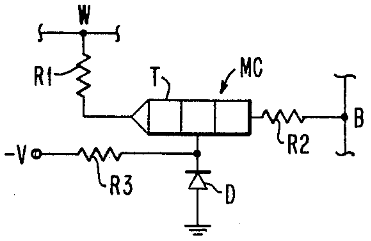
FIGS. 5 and 6 illustrate alternate embodiments of a memory cell in accordance with this invention.

An alternate embodiment of a memory cell MC is illustrated in FIG. 5. The memory cell of FIG. 4 is substantially identical to that of FIG. 3 except that a constant source —V is substituted for clear drive line C. Voltage source —V substantially defines, with resistor R3 load line L as shown in FIG. 3. The operation of the memory cells of FIGS. 2 and 5 are identical with respect to write and read operations, as hereinabove described. A clear operation, however, is effected by the nondestructive "breakdown" of the emitter-base junction of gate transistor T. For example, prior to a write operation, pulse generator PG connected to word drive line W is adapted to apply a positive drive pulse along word drive line W of sufficient amplitude to reverse bias and nondestructively "breakdown" the emitter-base junction of gate transistor T. At this time, the emitter-base region of gate transistor T operates essentially as a conventional PN junction, or semiconductor, diode and total current flow through tunnel diode D is reduced below the valley current $I_v$. Accordingly, the quiescent load line is lowered from L to L' and tunnel diode D is switched, or reset, to point X' along region I of curve A of FIG. 2. While word drive line W is energized positively, voltage V3 developed across tunnel diode D operating at point X' may or may not be sufficient to reduce the voltage across the emitter-base junction of gate transistor T to support "breakdown." Notwithstanding, the operation of tunnel diode D is established at point X when word drive line W is normalized.

Figure 6:
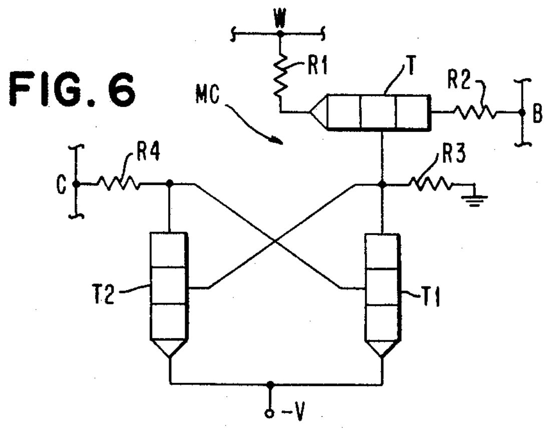

A further embodiment of this invention suitable for monolithic integration is illustrated in FIG. 6 wherein a bistable transistor arrangement is substituted for tunnel diode D of FIG. 2; it is evident that a similar substitution can be effected with respect to FIG. 5. As shown, the bistable transistor arrangement comprises NPN silicon transistor T1 and T2 having emitter regions multipled and connected to a source of negative voltage —V. The collector region of transistor T1 is connected along resistor R3 to ground and, also, to the base region of gate transistor T; also, the collector region of transistor T2 is connected along resistor R4 to clear drive line C which is appropriately biased by pulse generator PG to support bistable operation. Bistable operation is achieved by cross coupling emitter and collector regions of transistors T1 and T2 in conventional fashion. By definition, a stored "1" state is indicated by conduction in transistor T1. Again, the state of memory cell MC determines the bias voltage applied to the base region of gate transistor T across resistor R3. The difference in the voltage developed across resistor R3 in the stored "1" and stored "0" state is sufficient to support the nonlinear operation of gate transistor T, as hereinabove described. For example, while transistor T1 is conducting (stored "1" state), the voltage developed across resistor R3 is appropriately equal to —V and inhibits carrier injection into the base region of gate transistor T when word drive line W is energized; also, when transistor T1 is "cut off" (stored "0" state), the voltage across resistor R3 is substantially zero volts and energization of the word drive line W supports carrier injection into the base region of gate transistor T.

As hereinabove described, a write operation is initiated when pulse generator PG applies a positive clear pulse along clear drive line C. If memory cell MC is in a stored "1" state and transistor T2 is conducting, energization of clear drive line C drives transistor T1 into conduction; the resultant drop in voltage across resistor R3 from substantially zero volts to —V is sufficient to "turn off" transistor T2. The write and read operations are substantially as hereinabove described. Again, the operational mode of gate transistor T, i.e., either saturated or unsaturated, is determined by the energization or nonenergization, respectively, of bit drive line B with word drive line W and conduction therethrough is controlled by the storage state of memory cell MC. During read "0" and write "0" operations, circuit conditions support normal transistor operation in gate transistor T increased to provide a current pulse along bit drive line B; again, sense amplifier SA is appropriately strobed to distinguish between the read "0" and write "0" operations. Also, during the read "1" operation, energization of word drive line W is ineffective to support normal transistor operation in transistor T, such operation being indicated by an absence of current pulse along the bit drive line B. As in the embodiments of FIGS. 2 and 5, gate transistor T is driven into saturation only during the write "1" operation by concurrent energization of word and bit drive lines W and B. When saturated, the major portion of emitter current $I_e$ flows in the base current of transistor T2 below that level necessary to support conduction. When transistor T2 "turns off," the resultant rise in collector voltage as applied to the base region of transistor T1 supports carrier injection into the latter so as to switch memory cell MC to the stored "1" state. As hereinabove described, if the switching time of memory cell MC is less than the duration of drive pulses applied by pulse generators PG along word and bit drive lines W and B, a switching of the memory cell to the stored "1" state is effective to "turn off" gate transistor T. It is evident that the duration of drive pulses supplied by pulse generators PG along word and bit drive lines W and B should be sufficient to at least switch the state of the memory cell MC.

While the invention has been particularly shown and described with reference to preferred embodiments thereof, it will be understood by those skilled in the art that various changes in form and details may be made therein without departing from the spirit and scope of the invention.

What is claimed is:

1. In combination, a nonlinear gating device and a load device having an operating threshold, said gating device comprising a transistor having an emitter-collector circuit and a base circuit, and biasing means connected to said emitter-collector circuit, said base circuit supporting conduction in said transistor when said biasing means are energized, said biasing means being operative when energized to support a first magnitude and a second magnitude of current in said base circuit, said load device being connected in said base circuit and responsive to said current in said base circuit, said operating threshold of said load device being greater than said first magnitude of current and less than said second magnitude of current supported in said base circuit when said biasing means are energized.

2. In combination, a nonlinear gating device for driving a bistable load device having a predetermined current threshold and exhibiting first and second stable states, said gating device including a transistor having a base circuit and an emitter-collector circuit, said load being connected in said base circuit, means connected to said emitter-collector circuit for establishing said transistor in a first conduction state and a second conduction state while said load device is in said first stable state whereby a first magnitude and a second magnitude of current, respectively, is supported in said base circuit, said load device being responsive to said transistor when operated in said second conduction state to switch from said first to said second stable state, said second magnitude of current being in excess of said predetermined current threshold of said load device, conduction through said transistor being inhibited when said load device is in said second state.

3. In combination, a nonlinear gating device and a threshold type load device driven by said gating device, said gating device comprising a transistor having an emitter-collector circuit and a base circuit, and means for selectively biasing said transistor for normal transistor operation and for saturated operation, said base circuit supporting conduction in said transistor when said biasing means are operated, said load device being connected in said base circuit and responsive to said transistor only when said transistor is operated in saturation.

4. The combination as defined in claim 3 wherein said transistor is adapted as a current-driving source for said load device connected in said base circuit, said load device exhibiting a current threshold greater than the magnitude of base current in said transistor during normal transistor operation and less than the magnitude of base current in said transistor during saturated operation.

5. The combination as defined in claim 3 wherein said load device is adapted for bistable operation and is responsive to said transistor when saturated to switch from a first stable state to a second stable state, and means for switching said load device from said second stable state to said first stable state, said base circuit being operative to inhibit conduction in said transistor while said load device is in said second stable state.

6. The combination as defined in claim 5 wherein said load device is a tunnel diode.

7. The combination as defined in claim 5 wherein said load device comprises a bistable transistor arrangement having first and second input terminals, said first terminal being connected in said base circuit and said second terminal being connected to said switching means.

8. A memory arrangement comprising: a gating device having a word, bit-sense, and control line; first and second energizing means connected to said gating device at said word and bit-sense lines, respectively, and a storage element having a first and a second stable information state connected to said control line, said gating device being responsive to said first and second energizing means to energize said control lead to switch said storage means from said first to said second stable state, said gating device being responsive to the energization of said first energizing means only while said storage means is in said first stable state to energize said bit-sense line whereby information stored in said storage element is indicated.

9. In combination, a nonlinear gating device and a threshold type load device, said load device being adapted for bistable operation and exhibiting a first stable state and a second stable state, said gating device comprising a transistor having a base, emitter, and collector, said load device being connected to said base, first energizing means connected to said emitter, second energizing means connected to said collector, said first means being operative to support normal transistor operation in said transistor while said load device is in said first state, said first and second means being operative when concurrently energized to support saturated operation in said transistor while said load device is in said first state, conduction in said transistor being inhibited when said load device is in said second state, the threshold of said load device being at least greater than the transient base current during normal operation of said transistor and less than the base current during saturated operation of said transistor whereby said load device switches from said first to said second state when said transistor is saturated.

10. In a circuit arrangement, a gating arrangement having first, second, and third terminals, first and second means connected to said gating arrangement for energizing said first and second terminals, respectively, means including bistable means having first and second stable states connected to said third terminal, said gating arrangement including means responsive to the concurrent operation of said first and second means for energizing said third terminal and switching said bistable means from said first to said second state, said gating arrangement being responsive to the operation of said first means for energizing said second terminal only when said bistable means is operating in said first state.

11. In combination, a nonlinear gating device and a bistable load device exhibiting first and second stable voltage states, said gating device comprising a transistor element having an emitter, collector, and base, said load device being connected to said base, and means connected to said emitter and said collector for selectively biasing said transistor element for normal transistor operation and for saturated operation, the voltage difference between said first and said second voltage states being sufficient and insufficient, respectively, to support conduction in said transistor element while said biasing means are energized, said load device being responsive to said transstor element when saturated to switch from said first to said second stable state.

12. The combination a defined in claim 11 including means connected to said load device for switching said load device from said second to said first stable state.

13. The combination as defined in claim 11 wherein said biasing means is operative to nondestructively breakdown the emitter-base junction of said transistor element to switch said load device from said second to said first stable state.

14. A memory array comprising a plurality of word and bit drive lines arranged in coordinate fashion and defining a plurality of crossover points, a memory cell connected at each crossover point, said memory cell comprising a transistor having an emitter-collector circuit connected between word and bit drive lines defining said each crossover point and a base circuit, a threshold storage device connected in said base circuit and exhibiting a first and second stable storage state, driving means connected to said word and bit drive lines for biasing said transistor device for normal transistor operation and saturated operation, said base circuit supporting conduction in said transistor while said storage device is operating in said first storage state, said storage device being responsive to said transistor device when saturated to switch from said first to said second storage state.

15. A memory array comprising a plurality of word and bit drive lines arranged in a coordinate array and defining a plurality of crossover points, a memory cell connected at each crossover point and including a transistor having an emitter-collector circuit connected between said word and bit drive lines defining said each crossover point and a base region, a bistable type storage device connected in said base region and exhibiting first voltage and second stable voltage states, first means for energizing said word drive line on a selective basis and effective to support carrier injection into base region while said storage device is in said first voltage state and ineffective to support carrer injectiion into said base region while said storage device is in said second voltage state, second means for energizing said bit drive line on a selective basis to bias said collector region for near-saturated operation whereby said transistor is driven into saturation when said word and bit drive lines are concurrently energized and said storage element is in said first storage state, said storage element being responsive to said transistor when saturated to switch from said first to said second voltage state.

16. A memory array as defined in claim 15 including further means for switching said storage device from said second to said first voltage state.

17. A memory array as defined in claim 15 including sensing means connected to said bit drive line for ascertaining the state of said storage device.

18. A memory array as defined in claim 15 wherein said storage device exhibits a threshold greater than the transient base current in said transistor during normal transistor operation and less than the base current in said transistor during saturated operation.

19. A memory array as defined in claim 15 wherein said storage element comprises a bistable transistor arrangement having a first and a second input terminal, said first input terminal being connected to said base region, and means connected to said second input terminal for resetting said bistable transistor arrangement.

20. In combination, a gating device having a pair of terminals and a third terminal, each of said pair of terminals serving a dual function as input and output terminals, means connected to said third terminal for supplying a signal to be directed to either of said pair of dual function terminals, and means for energizing two of said terminals including at least one of said pair of dual function terminals, said gating device ncluding means responsive to the concurrent energization of said two terminals for directing said signal to the other of said pair of dual function terminals.

21. In a circuit arrangement, a transistor having base, collector, and emitter terminals, said base and collector terminals serving a dual function as input and output terminals, and means for energizing concurrently said emitter terminal and one of said dual function terminals, the concurrent energization of said emitter terminal and said one dual function terminal being operative to energize the other of said dual function terminals.

References Cited

UNITED STATES PATENTS 2,763,832 9/1956 Shockley ---------- 307—88.5

OTHER REFERENCES

J. B. Earnshaw: "Design for a Tunnel Diode—Transistor Store With Nondestructive Read-Out of Information," IEEE Trans. on Electronic Computers, pp. 710–722, December 1964.

BERNARD KONICK, *Primary Examiner.*

J. F. BREIMAYER, *Assistant Examiner.*